March 3, 1931.  F. H. MUSSLER  1,794,472
HYDRAULIC CHANGE SPEED GEAR MECHANISM
Filed Oct. 16, 1925   5 Sheets-Sheet 3

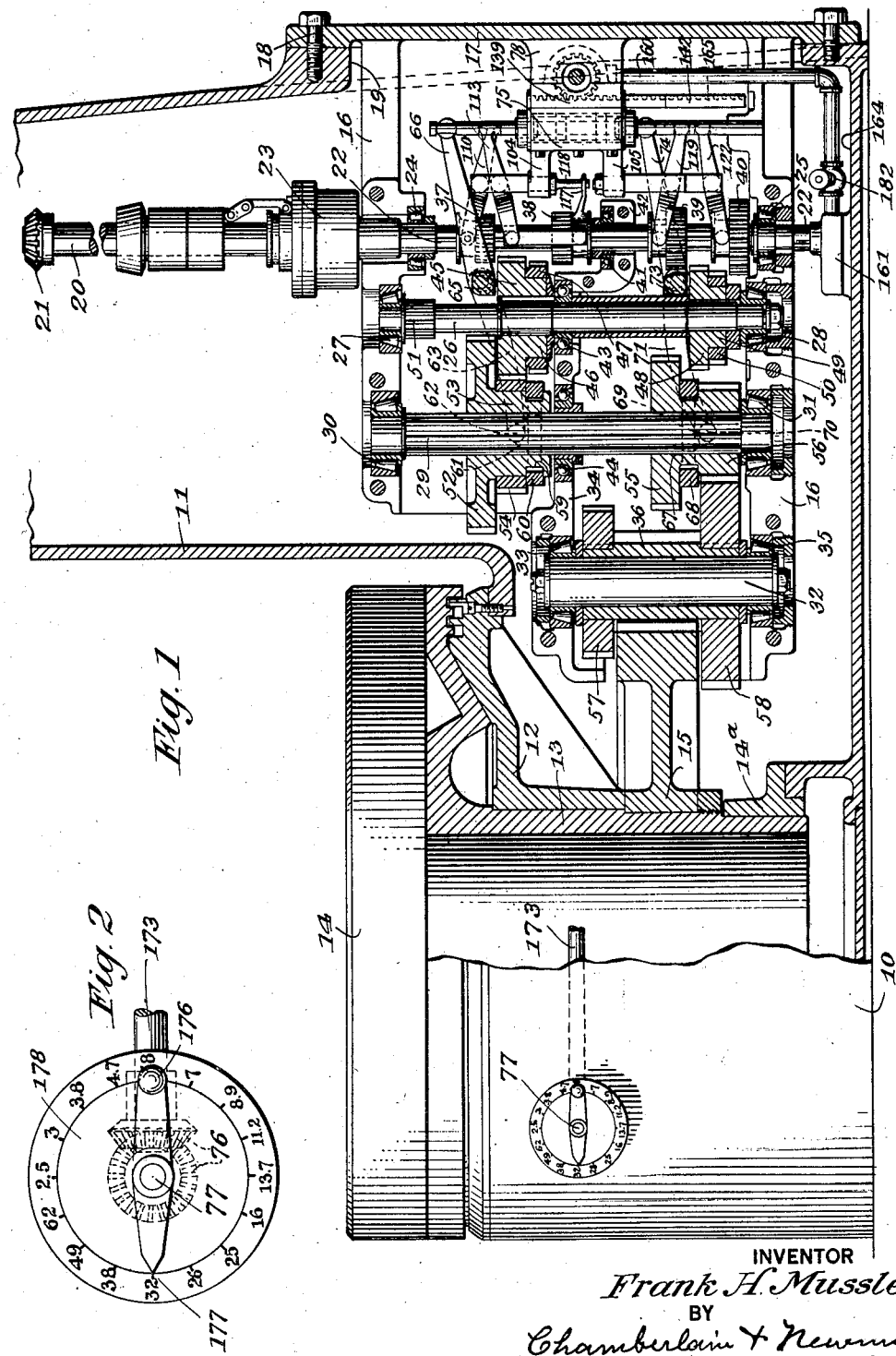

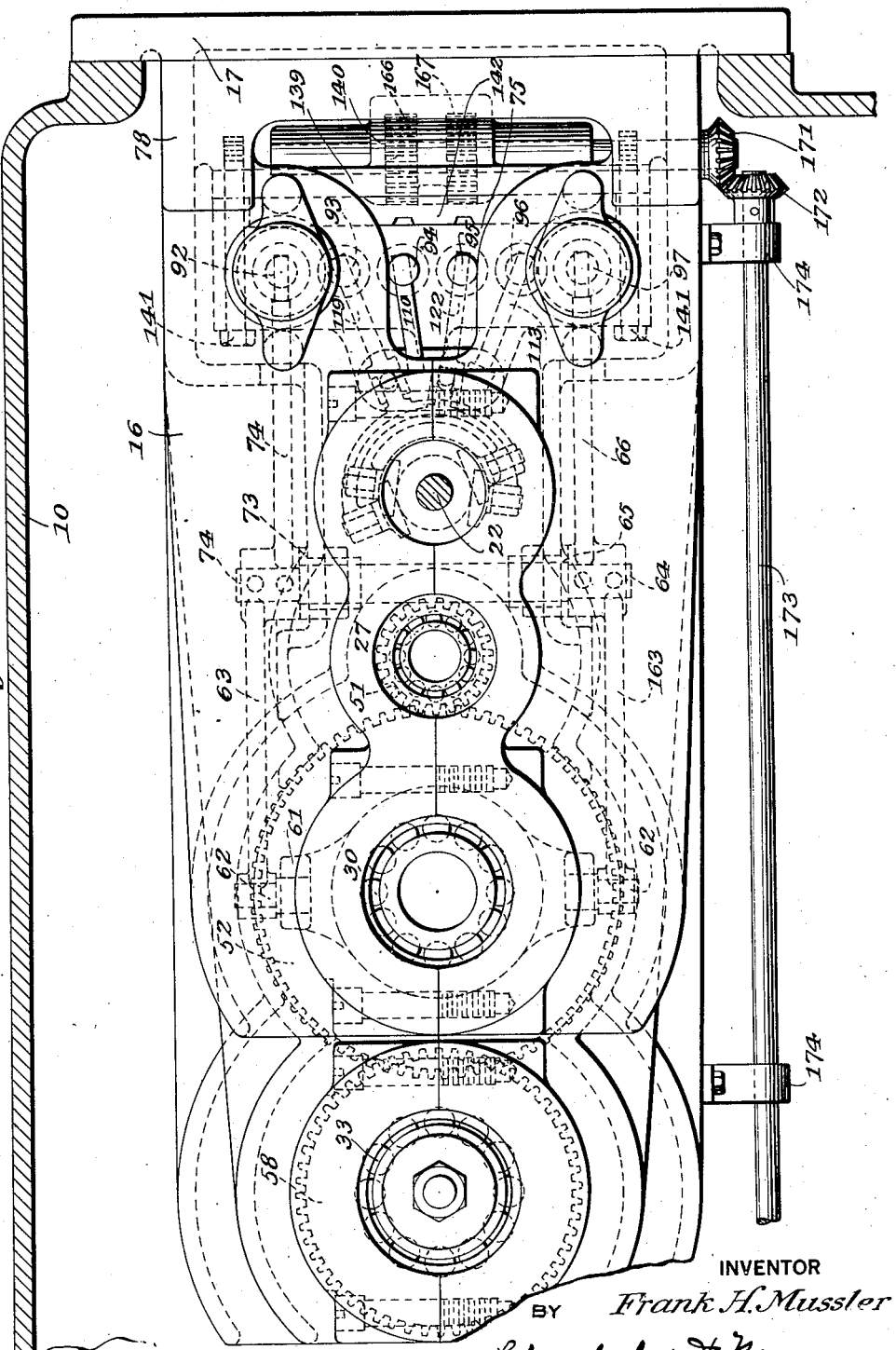

INVENTOR
*Frank H. Mussler*
BY
*Chamberlain & Newman*
ATTORNEYS

March 3, 1931.  F. H. MUSSLER  1,794,472
HYDRAULIC CHANGE SPEED GEAR MECHANISM
Filed Oct. 16, 1925   5 Sheets-Sheet 4
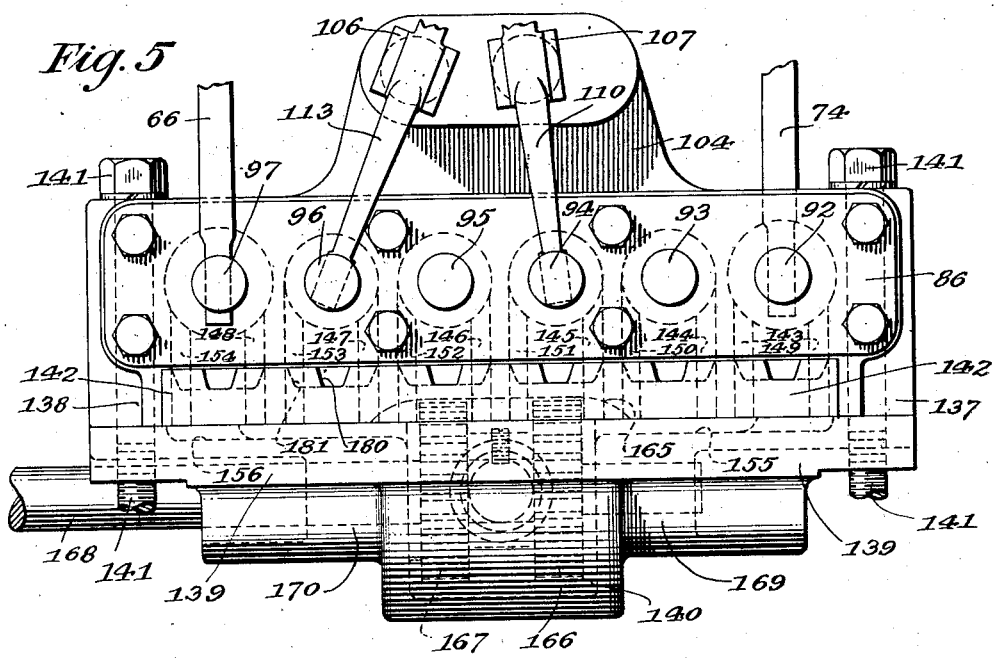
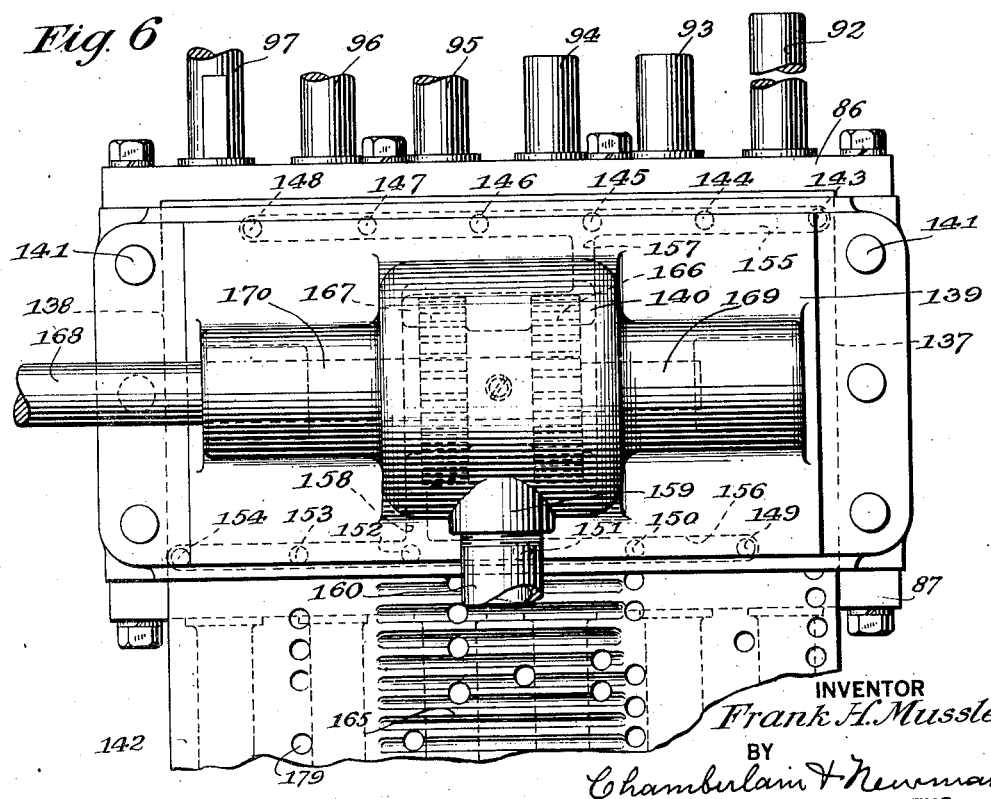
INVENTOR
Frank H. Mussler
BY
Chamberlain & Newman
ATTORNEYS INVENTOR
Frank H. Mussler
BY
Chamberlain + Newman
ATTORNEYS Patented Mar. 3, 1931

1,794,472

UNITED STATES PATENT OFFICE

FRANK H. MUSSLER, OF BRIDGEPORT, CONNECTICUT, ASSIGNOR, BY MESNE ASSIGN-
MENTS, TO THE BULLARD COMPANY, OF BRIDGEPORT, CONNECTICUT, A CORPORA-
TION OF CONNECTICUT

HYDRAULIC CHANGE-SPEED-GEAR MECHANISM

Application filed October 16, 1925. Serial No. 62,876.

The present invention relates to speed change mechanism and particularly a power operated mechanism for use in vertical turret lathes and other forms of machine tools and also with any other type of mechanism where the speed of the moving parts are adapted to be changed by shifting gears, for the purpose of increasing the speed or power as applied to the machine. The present disclosed embodiment of the invention is adapted for hydraulic operation.

An object of the invention is to provide a mechanism of this character by means of which change speed gears may be selectively shifted without the necessity of the operator actually moving the gears, and to this end it is proposed to provide a machine in which a dial or other suitable indexing means is provided, containing indications of the varying speeds and ratios of the gears, and which may be set at any desired position, whereupon the automatic means of the invention is adapted to shift the gears into the relation selected upon the dial.

A further object is to provide a mechanism which will be substantially instantaneous in operation and in which a plurality of gears may be simultaneously moved without interfering with each other.

While the invention is illustrated in connection with a turret lathe, it will be understood that the invention may be applied to other types of machines, and also to automobiles.

With the above and other objects in view, an embodiment of the invention is shown in the accompanying drawings, and this embodiment will be hereinafter more fully described with reference thereto and the invention will be finally pointed out in the claims.

In the drawings:—

Fig. 1 is a vertical sectional view, partly in side elevation, of a turret lathe employing change speed gear shifting mechanism according to the present embodiment of the invention;

Fig. 2 is a detail elevation showing the indexing dial employed therein;

Fig. 3 is a plan view of the change speed mechanism;

Fig. 5 is an enlarged plan view of the piston and compression chamber employed;

Fig. 6 is an elevation view thereof;

Similar reference characters indicate corresponding parts throughout the several figures of the drawings.

Figure 4:
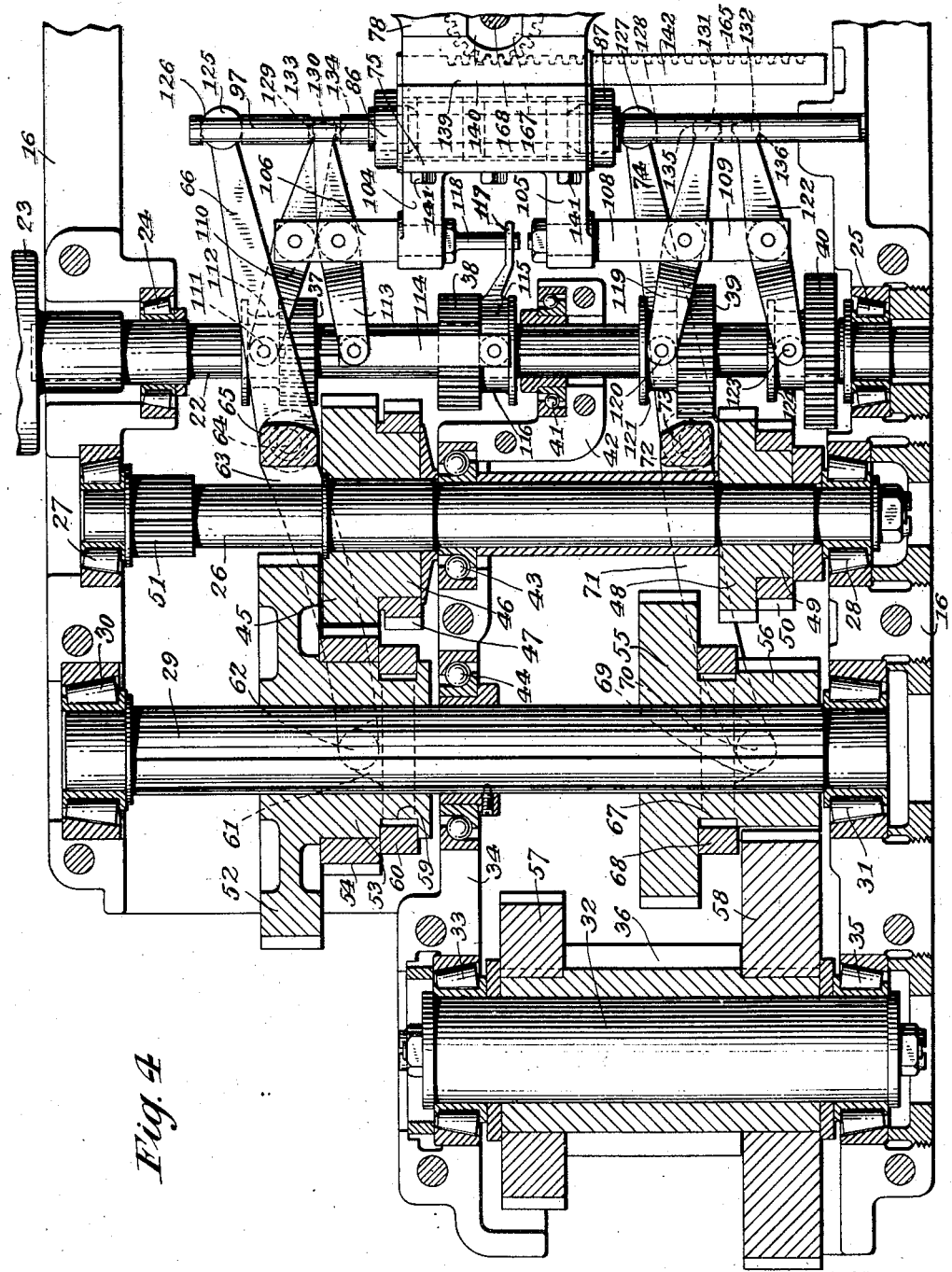
Fig. 4 is an enlarged vertical sectional view thereof, and showing substantially the same parts as shown in Fig. 1.

Referring to the drawings and more particularly to Fig. 1 thereof, the vertical turret lathe shown by way of example comprises a base 10 bearing a vertical column 11 and a spindle bearing 12 disposed forwardly of the column and in which the vertical spindle 13 of the work carrying table 14 is rotatably supported, said spindle being further supported at its lower end in a cylindrical bearing 14ª of the base 10. A large gear 15 is secured upon the spindle 13 between the bearings 12 and 14ª and is adapted to be rotated at varying speeds by the change speed gear mechanism of the present invention, the particular speed depending upon the setting of the mechanism.

The change speed mechanism is mounted in the base 10 at the lower end of the column 11, and comprises a frame 16 removably supported in the base upon a plate 17 secured by bolts 18 over an opening 19 in the rear wall of the column 11, and whereby the mechanism may be conveniently slid into and over any place for change of gears or repairs.

The main drive shaft 20 of the machine is supported vertically in the column 11, being provided at its upper end with a beveled gear 21 adapted to be meshed with suitable driving mechanism in the superstructure of the machine, (not shown) and is connected to the drive shaft 22 of the change speed mechanism by means of a clutch 23, this clutch being connected during the normal operation of the machine.

The shaft 22 is rotatably mounted at its upper and lower ends in roller bearings 24 and 25 supported in the upper and lower walls of the frame 16, and between said bearings the shaft is splined for the purpose of forming a sliding and driving connection between it and the several gears carried thereon. Forwardly of the shaft 22 there is provided a vertical intermediate drive shaft 26, supported at its upper and lower ends in roller bearings 27 and 28, mounted in the upper and lower walls of the frame 16, and forwardly of this shaft 26 there is provided a splined shaft 29, supported at its upper and lower ends in roller bearings 30 and 31, mounted in the upper and lower walls of the frame 16. These several shafts 22, 26 and 29 are adapted through meshing gears carried thereon to drive a vertical shaft 32 mounted at its upper end in roller bearings 33 secured in an intermediate bearing supporting wall 34 of the frame 16, and at its lower end in roller bearings 35 supported in the lower wall of the frame 16. The shaft 32 is provided with a pinion 36 which meshes with the gear 15 of the spindle 13 to drive the latter.

Upon the splined shaft 22 there are slidably mounted a series of four gears 37, 38, 39 and 40 of gradually increasing diameter, the gear 37 having the smallest number of teeth and the gear 40 the largest, and the gears being so spaced as to be slidable upon said shaft by the shifting mechanism hereinafter to be described. The splined shaft is supported intermediate its ends and between the gears 38 and 39 in a ball-bearing 41 mounted in a downwardly off-set extension 42 of the portion 34 of the frame. The shafts 26 and 29 are also similarly supported intermediate their ends by ball bearings 43 and 44 mounted in said portion 34 of the frame. As shown in Fig. 3 the frame is formed in two halves, bolted together in a manner to clamp the bearings in place.

The shaft 26 is provided at a point above the bearing 43, and intermediate the gears 37 and 38 of the shaft 22, with a gear 45 keyed thereon and of a diameter and pitch adapted to mesh with the gear 37 upon shifting of the latter, and upon a reduced portion 46 of said gear 45 there is secured a ring gear 47 of a diameter and pitch adapted to mesh with the gear 38 of the shaft 22 upon shifting of said gear 38. At the lower end of the shaft 26 there is provided a gear 48 keyed thereon and of a diameter and pitch adapted to mesh with the gear 39 of the shaft 22, and upon a reduced extension 49 of said gear 48 there is secured a ring gear 50 of a diameter and pitch adapted to mesh with the gear 40 of the shaft 22. It will thus be seen that by selectively shifting one or the other of the gears 37, 38, 39 and 40 into mesh with the respective gears 45, 47, 48 and 50 the shaft 26 may be driven at four different speeds with respect to the constant speed of the shaft 22. At the upper end of the shaft 26 there is secured a pinion 51 adapted for driving the shaft 29 as will presently appear.

Upon the shaft 29 there is slidably splined a large gear 52 of such diameter and pitch as to mesh with the pinion 51 upon shifting of said gear to its raised position, as distinguished from the lowered position as illustrated in the drawings, and upon a reduced hub portion 53 of said gear 52 there is secured a ring gear 54 of a diameter and pitch adapted to mesh with the gear 45 of the shaft 26, the illustration showing this gear 54 in mesh. By shifting the gears 52 and 54 into mesh with the respective gears 51 and 45, the shaft 29 may be driven at two different speeds with respect to the shaft 22. The shaft 29, it will be seen, is driven at eight different speeds with respect to the shaft 22.

Upon the lower portion of the shaft 29 there is slidably splined a compound gear including a large diameter gear portion 55 and a small diameter gear portion 56, adapted to be respectively meshed with a gear 57 secured upon the upper end of the pinion 36 of the shaft 32 and a gear 58 secured to the lower end of said pinion. By shifting of the gears 55 and 56 into respective mesh with the gears 57 and 58, the pinion 36 is adapted to be driven at two different speeds with respect to the shaft 29, and therefore at sixteen different speeds with respect to the shaft 22.

The gear 52 of the shaft 29 is provided at the lower end of its hub portion 53 with an annular channel 59 in which there is loosely engaged a collar 60 provided at diametrically opposite points and beyond the periphery of the gear 54 with upwardly projecting lugs 61, to which there are pivotally connected at 62 the ends of a fork lever 63, pivotally mounted upon a shaft 64 supported in a suitable bearing 65 of the frame, and provided with a rearwardly projecting lever arm 66, rotation of this lever adapted to engage one or the other gears 52 and 54, with the respective gears 51 and 45. The collar 60 has limited lateral movement in the channel 59.

The gear 55 of the shaft 29 is also adapted to be shifted in a similar manner, and for this purpose is provided with an annular channel 67 in which there is loosely engaged for limited lateral movement a collar 68 provided at diametrically opposite points and beyond the periphery of the gear 56 with downwardly extending lugs 69, to which there are pivotally connected at 70 the forward ends of a fork lever 71, pivotally supported upon a shaft 72 mounted in a bearing 73 of the frame, said lever being provided with a rearwardly projecting lever arm 74.

Figure 8:
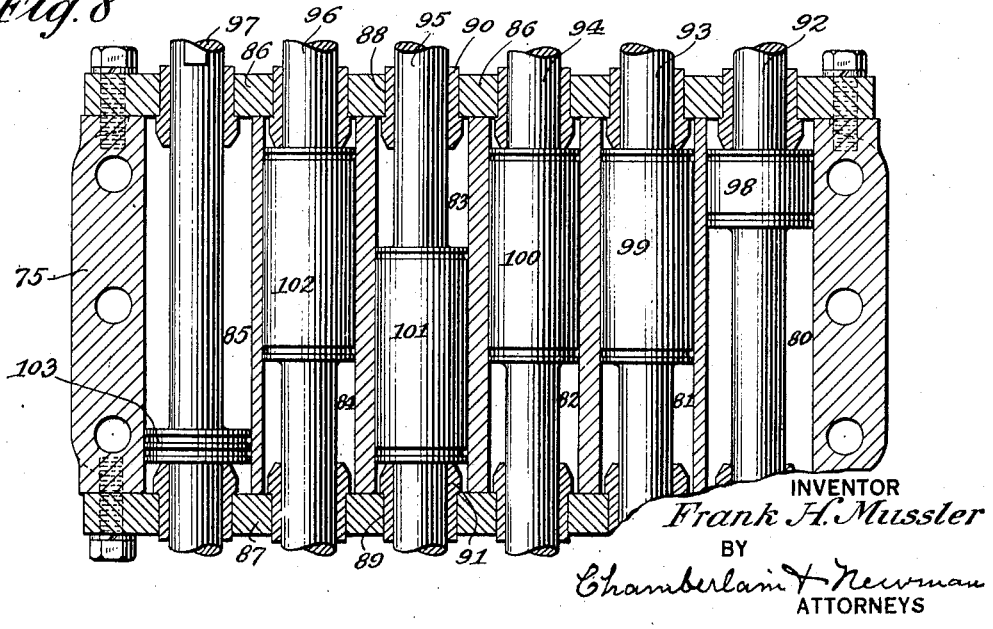
Fig. 8 is a vertical sectional view through the piston chamber.

Forwardly of the shaft 22 there is provided the mechanism for operating the gear shift levers, and which comprises a frame or block 75 supported on an extension 78 of the back plate 17 by screw bolts 141. The frame 75 is provided with a series of six vertical cylinders 80, 81, 82, 83, 84 and 85 (Fig. 8) closed at their upper and lower ends by closure head plates 86 and 87 bolted to the frame, these closure plates being apertured in axial alignment with the upper and lower ends of the cylinders, as at 88 and 89, and supporting shouldered bushings 90 and 91, in which are guided piston rods 92, 93, 94, 95, 96 and 97 movable in said cylinders, said rods being provided within the cylinders with pistons 98, 99, 100, 101, 102, and 103, the pistons 99 to 102 being relatively long and of the same length, while the pistons 98 and 103 are relatively shorter, and whereby the piston rods 92 and 97 have a movement considerably longer than the movement of the pistons 99 to 102, these pistons 98 and 103 adapted, as will be presently more fully pointed out, to be operated to shift the gears upon the shaft 29 while the pistons 99 to 102 are adapted to be operated to shift the gears 37, 38, 39 and 40 upon the shaft 22.

The frame 75 is provided at its inner side with spaced projecting bracket portions 104 and 105, the portion 104 supporting vertical upwardly extending posts 106 and 107, and the portion 105 supporting vertical downwardly extending posts 108 and 109. Upon the post 106 there is pivotally supported a yoke lever 110 provided at its yoke end with rollers 111 engaged in an annular channel 112 of the gear 37. Pivotally mounted on the post 107 there is provided a yoke lever 113 having downwardly extending links 114, pivotally connected at its yoke ends and which are pivotally connected at their lower ends to a collar 115 rotatable in an annular channel 116 of the gear 38, said collar being provided with an apertured forwardly projecting arm 117 slidably engaged upon a vertical guide post 118 secured to and depending from the bracket 104. This construction permits shifting of the gear 38 by swinging of the lever 113 without relative rotation of the collar 116 with respect to said gear. Upon the post 108 there is pivotally supported a yoke lever 119 provided at its yoke ends with rollers 120 engaged in an annular channel 121 of the gear 39, and pivotally mounted on the post 109 there is provided a yoke lever 122 provided at its yoke end with rollers 123 engaged in an annular channel 124 of the gear 40.

As clearly indicated in Fig. 3, the lever arms 66 and 74 are disposed in parallel and spaced relation to each other at each side of the levers 110, 113, 119 and 122, the lever 66 being provided with a circular end 125 engaged in a slot 126 in the upper end of the piston rod 97 while the lever 74 is provided with a circular end 127 engaged in a slot 128 in the lower end of the piston rod 92. The several levers 110, 113, 119 and 122 are disposed in radial relation to the axis of the shaft 22, (Fig. 3) and at their ends are respectively provided with circular portions 129, 130, 131 and 132 engaged in slots 133, 134, 135 and 136 of the respective piston rods 94, 96, 93 and 95, the slots 133 and 134 being at the upper ends of the rods 94 and 96 while the slots 135 and 136 are at the lower ends of the rods 93 and 95.

Figure 7:
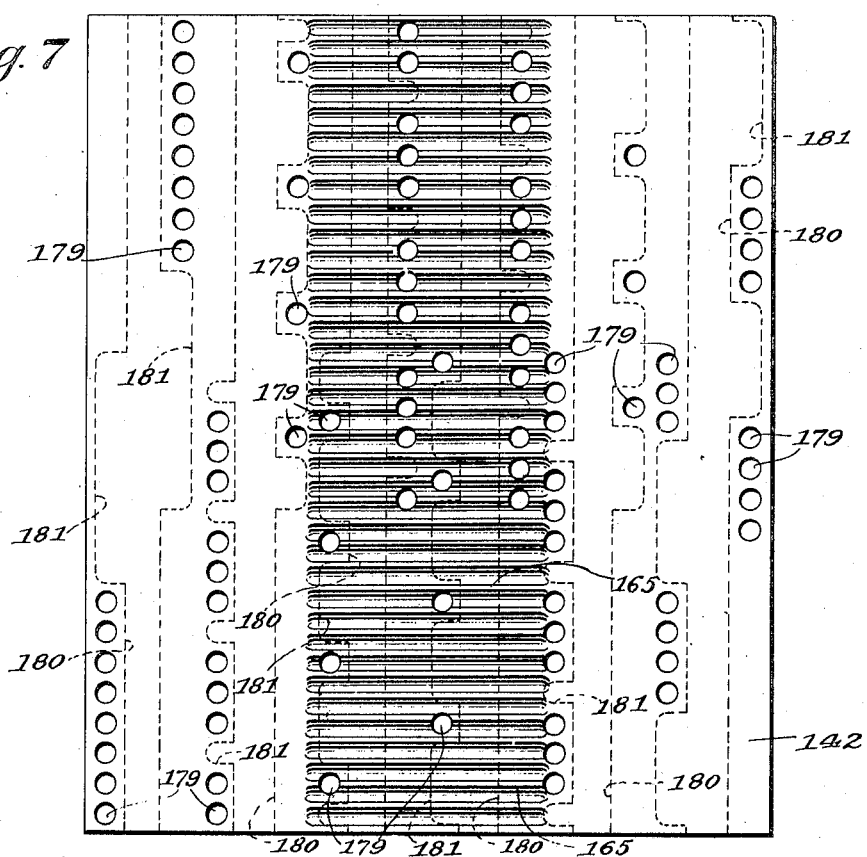
Fig. 7 is a detached side elevational view showing the reciprocating slide valve or gate member adapted for opening and closing ports to the piston chambers and for admitting pressure thereto.

At each side of the block 75 there are provided projecting vertical guide flanges 137 and 138, upon which the vertical base plate 139 of the chambered pressure member 140 is secured by bolts 141, a vertically movable gate member 142, shown in detail in Fig. 7, being slidably mounted in the vertical space formed between the block 75, the base 139, and the flanges 137 and 138. The block 75 is provided at the upper ends of the cylinders, and substantially tangential to one side thereof, with lateral ports 143, 144, 145, 146, 147 and 148, and at the lower ends, and substantially tangential to the other side, with ports 149, 150, 151, 152, 153 and 154. In the base 139 of the pressure chamber member there are provided upon the inner face thereof horizontal upper and lower conduit grooves 155 and 156 registering with the upper and lower ports of the cylinders, as shown in Fig. 6, the upper grooves being connected by a passage 157 and the lower groove by a passage 158 with the pressure chamber 140, the cylinder ports adapted to be opened with respect to the pressure chamber by means of port openings in the gate member 142, presently to be more fully described.

The chamber 140 is provided at its lower side with an interiorly threaded boss 159 in which is secured one end of a fluid pressure feed pipe 160, extending downwardly into the base 10 and connected at its lower end with a fluid pressure pump 161, the gear of which is mounted on lower end of main drive shaft 20, so that a continuous constant pressure is maintained during the operation of the machine. The pump is adapted to contain a fluid pressure medium, as oil, which is returned, after use in the cylinders, to the reservoir 164 in the base 10 where it flows into pump which rests in said reservoir.

The gate 142 is provided along a central vertical portion thereof and upon its outer face with rack teeth 165, which are engaged by gears 166 and 167, secured within the pressure chamber upon a shaft 168, journaled in bearing portions 169 and 170 at each side of said chamber, and provided at its outer end with a bevel gear 171, meshing with a bevel gear 172, provided at one end of a shaft 173, journaled in suitable bearings 174 secured to the frame 16, and extending to the forward side of the machine, where further bevel gears 76 form an operative connection with a short shaft 77 upon which is provided a crank handle 176 having an index portion 177 cooperating with a stationary index dial 178 secured upon the base 10. By turning the crank 176 it will be seen that the gate member is moved vertically, the indications upon the dial showing the setting with respect to the cylinders.

The gate is provided with a series of ports 179, so arranged that at any given setting either an upper or a lower port of one or more of the cylinders is opened, permitting the fluid under pressure to enter such cylinder, or cylinders, and move the piston therein, which through the gear shift levers operates the gears, the arrangement of the ports being such as to provide for sixteen different settings, and thereby adapted to effect the sixteen different speed arrangements of the gear mechanism. It is obvious, of course, that the present showing with sixteen settings is an arbitrary one, and that any desired speed change capacity may be provided.

Upon the inner side in contact with the block 75 the gate member is provided with a series of vertical channels 180, the side walls of which are between the upper and lower ports of the respective cylinders, and which are provided upon each of said side walls with cut-out portions 181 adapted to register with either the upper or lower cylinder port, as the other port of the cylinder is in register with one of the ports 179, so that as the pressure fluid is admitted at one side of one of the pistons the fluid at the other side is permitted to flow into the cut-out 181 and along the vertical channel 180 into the reservoir 164 of the base 10 wherein is positioned the pump 161 by means of which the same fluid is continuously used.

In operation, the change speed gear mechanism is set as desired through manual turning of the crank handle 176 to the corresponding index indication on the dial 178, whereupon the pistons are operated and through the shift levers the gears are shifted to the desired relation. It will be understood that a change may be effected by the simultaneous operation of any two or possibly more of the pistons, one necessarily operating to release while another operates to engage or by operation of any one of the pistons 99 to 102 in combination with either, or both of the pistons 98 and 103.

A constant pressure of the fluid is maintained, of 30 pounds for example, so that the mechanism remains in the set position until a change is desired, the pressure being preferably regulated by a suitably adjustable safety valve, indicated as 182. In machine tool use the setting will remain unchanged during relatively long periods, that is, while operating upon a particular character of work.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:

1. In a change speed gear mechanism, transmission gearing including a gear means adapted to be shifted, a fluid pressure cylinder, a piston in said cylinder, means connecting said piston to said gear means, whereby the latter is adapted to be shifted upon movement of said piston, said cylinder having ports at each end, a fluid pressure chamber secured in spaced relation to said cylinder, and having ports in register with said cylinder ports, a slide valve disposed in said space between the cylinder and pressure chamber, and having ports adapted upon selective movement to register with said cylinder and chamber ports at either end of said cylinder, a rack on said slide valve, and manually operable gearing engaging said rack for moving it.

2. In a change speed gear mechanism, transmission gearing including gear means adapted to be shifted, a fluid pressure cylinder, a piston in said cylinder, means connecting said piston to said gear means, whereby the latter is adapted to be shifted upon movement of said piston, said cylinder having ports at each end, a fluid pressure chamber secured in spaced relation to said cylinder, and having ports in register with said cylinder ports, a slide valve disposed in said space between the cylinder and pressure chamber, and having ports adapted upon selective movement to register with said cylinder and chamber ports at either end of said cylinder, a rack on said slide valve, manually operable gearing engaging said rack for moving it, and index means for indicating the relation of said slide valve to said cylinder.

3. In a change speed gear mechanism, transmission gearing including a plurality of gears adapted to be shifted, a plurality of fluid pressure actuated means respectively connected to said gears, and means for selectively admitting pressure to said fluid pressure actuated means whereby one of said gears are shifted individually or two or more of said gears are shifted simultaneously.

4. In a change speed gear mechanism, transmission gearing including a plurality of gears adapted to be shifted, a plurality of fluid pressure actuated means respectively connected to said gears to move in one or the other directions, and means for selectively admitting pressure to said fluid pressure actuated means, whereby one of said gears are shifted or two or more of said gears are shifted in one or the other directions simultaneously.

5. In a change speed gear mechanism, transmission gearing including a plurality of gears adapted to be shifted, a plurality of fluid pressure cylinders, a piston in each of said cylinders, means connecting said respective pistons to said respective gears whereby the latter are shifted upon movement of said pistons, and means for selectively admitting fluid pressure at either side of one of said pistons or two or more of said pistons simultaneously.

6. In a change speed gear mechanism, transmission gearing including a plurality of gears adapted to be shifted, a plurality of fluid pressure cylinders, a piston in each of said cylinders, means connecting said respective pistons to said respective gears, whereby the latter are shifted upon movement of said pistons, said cylinders each having a port at its respective ends, a fluid pressure chamber having ports in directly aligned and registered relation with said cylinder ports, and valve means for selectively connecting said cylinder ports and said pressure chamber ports.

7. In a change speed gear mechanism, transmission gearing including a plurality of gears adapted to be shifted, a plurality of fluid pressure cylinders, a piston in each of said cylinders, means connecting said respective pistons to said respective gears, whereby the latter are shifted upon movement of said pistons, said cylinders each having a port at its respective ends, a fluid pressure chamber having ports in directly aligned and registered relation with said cylinder ports, and valve means for selectively connecting either one of said ports of one or more of said cylinders and said pressure chamber ports, whereby one or more of said gears are shifted in one or the other directions.

8. In a change sped gear mechanism, transmission gearing including a plurality of gears adapted to be shifted, a plurality of fluid pressure cylinders, a piston in each of said cylinders, means connecting said respective piston to said respective gears, whereby the latter are shifted upon movement of said pistons, said cylinders each having a port at its respective ends, a fluid pressure chamber having ports in register with said cylinder ports, a slide valve having a plurality of ports for selectively connecting either one of said ports of one or more of said cylinders and said pressure chamber ports, whereby one or more of said gears are shifted in one or the other directions, and means on said slide valve for opening one cylinder port for the release of fluid as the other port of said cylinder is connected to a pressure chamber port.

9. In a change speed gear mechanism, transmission gearing including a drive shaft having a plurality of shiftable gears thereon, another shaft having gears thereon each adapted to be selectively meshed with one of said gears of said drive shaft, a plurality of fluid pressure actuated means respectively connected to said gears on said drive shaft, and means for selectively admitting fluid pressure to said fluid pressure actuated means whereby any one of said gears of said drive shaft may be shifted individually or two or more simultaneously.

10. In a change speed gear mechanism, transmission gearing including a drive shaft having a shiftable gear thereon, a driven shaft having a shiftable gear thereon, an intermediate shaft having gears thereon adapted for mesh with said shiftable gears of said drive and said driven shaft, a plurality of fluid pressure actuated means respectively connected to said shiftable gears of said drive and driven shaft, and means for selectively admitting fluid pressure to said pressure actuated means whereby one of said gears is shifted individually or two or more of said gears of said drive and driven shaft may be shifted simultaneously.

11. In a change speed gear mechanism, transmission gearing including a driving shaft having pair of spaced different diameter gears thereon, a driven shaft having a shiftable compound gear thereon adapted upon shifting in one or the other directions to be meshed with one or the other gears of said driving shaft, a further shaft having a pair of spaced different diameter gears thereon, and a further shiftable compound gear on said driven shaft adapted upon shifting in one or the other directions to be meshed with one or the other gears on said further shaft, a plurality of fluid pressure actuated means adapted for operation in one or the other directions respectively connected to said compound gears of said driven shaft, and means for selectively admitting fluid pressure to said fluid pressure actuated means, whereby one of said compound gears may be shifted in one or the other directions or both shifted simultaneously.

12. In a change speed gear mechanism, transmission gearing including a drive shaft having a plurality of shiftable different diameter gears thereon, another shaft having different diameter gears thereon adapted to be selectively meshed with one of said gears of said drive shaft, a driven shaft having a compound gear thereon adapted upon shifting in one or the other directions to be meshed with one or another gear on said second-mentioned shaft, a further shaft having a pair of spaced different diameter gears thereon, and a further shiftable compound gear on said driven shaft adapted upon shifting in one or the other directions to be meshed with one or the other gears on said further shaft, a plurality of fluid pressure actuated means adapted for operation in one or the other directions respectively connected to said shiftable gears of said drive shaft and said driven shaft, and means for selectively admitting fluid pressure to said fluid pressure actuated means, whereby any one of said gears on said drive shaft or one or both of said compound gears on said driven shaft, and any one of said first-mentioned gears and one of said compound gears, may be shifted in one or the other directions or both shifted simultaneously.

Signed at Bridgeport, in the county of Fairfield and State of Connecticut, this 12th day of October A. D. 1925.

FRANK H. MUSSLER.